Jan. 14, 1969 SHIZUHIKO TANIGAWA ETAL 3,422,230

MOUNTING STRUCTURE FOR ROTATING MAGNETIC HEADS

Filed June 18, 1965 Sheet 7 of 10

3,422,230
MOUNTING STRUCTURE FOR ROTATING MAGNETIC HEADS

Shizuhiko Tanigawa, Moriguchi-shi, Yoshio Yabuno, Toyonaka-shi, Koji Nakamura, Osaka, Takuji Nakamura, Kadoma-shi, and Nobuyoshi Fujimori, Toyonaka-shi, Japan, assignors to Matsushita Electric Industrial Co., Ltd., Kadoma-shi, Osaka, Japan, a corporation of Japan Filed June 18, 1965, Ser. No. 465,046
Claims priority, application Japan, June 23, 1964 (all utility models), 39/49,919, 39/49,920, 39/49,921; Nov. 16, 1964, 39/89,283; Feb. 24, 1965, 40/15,208; Feb. 25, 1965, 40/15,290; Mar. 12, 1965, 40/19,989, 40/19,990, 40/19,992; Apr. 13, 1965, 40/30,163
U.S. Cl. 179—100.2 9 Claims
Int. Cl. G11b *5/10*

This invention generally relates to the mechanism of magnetic recording and reproducing systems, and more particularly to the mechanism of rotary head devices of the type for use with visible image recording and/or reproducing systems in which the images are directly recorded on a magnetic tape.

One of the most widely known methods presently used with television image recording apparatus includes directly recording an electrical signal corresponding to television images on a magnetic tape, reproducing the signal at a suitable time, and supplying the reproduced electrical signal to a television screen so that the visible image can be viewed on the television screen.

In the methods of magnetic recording hitherto employed in the art in which a signal such as a television signal at an extremely high frequency or a signal ranging over an extremely wide frequency band is directly recorded on a magnetic tape, it has been necessary to move a recording or reproducing head at a very high speed relative to the speed of a magnetic medium in order that high-frequency components of the recorded signal can satisfactorily be reproduced. One of the prior methods used to attain this purpose employs four recording heads mounted on a rotary disc. According to this method, the recording heads on the rotary disc are mechanically rotated at high speed across the magnetic tape to obtain the required relative speed between the tape and the recording heads. The magnetic tape is made to pass over the heads at a rate of 15 inches per second in the longitudinal direction of the tape so that the signal is recorded on the tape as a series of transverse lines or tracks. In this method, the rotary disc is rotated at a rate of 14,400 r.p.m. and a tape guide cylinder is provided to cover the circumference of the rotary disc so that the tape of 2 inches in width can make moving contact with the disc over an arc of about 100 degrees. A method proposed as an improvement of the above-described method comprises scanning of a tape by recording heads which are disposed in slanted relation with respect to the tape. In this case, the tape travels round or half round a stationary guide cylinder and recording rotary heads are disposed in the tape guide cylinder. The tape runs in a direction at an angle with respect to the tape guide cylinder with the result that the tracks so recorded are slanted with respect to the longitudinal direction of the tape.

In any of the above-described methods, mounting of the magnetic heads on the rotary disc must be effected with very severe mechanical accuracy and this has been a great obstruction to successful replacement of the magnetic heads.

Having the drawbacks of prior techniques as described above in mind, it is the primary object of the present invention to provide a magnetic recording and reproducing apparatus having an improved rotary head device which comprises a rotatable head mounting base of substantially rectangular shape having magnetic heads mounted on opposite ends thereof.

Another object of the present invention is to provide a magnetic recording and reproducing apparatus of the above character which is provided with a drive shaft for rotating the head mounting base and a flange having its central portion securely fixed to the drive shaft and in which the head mounting base is detachably mounted centrally thereof on the flange.

Still another object of the present invention is to provide a magnetic recording and reproducing apparatus of the above character which is provided with a motor shaft for causing the rotation of the head mounting base and a flange having its central portion securely fixed to the motor shaft, in which the head mounting base is detachably mounted at its central portion on the flange with a central perforation at the center of rotation of the head mounting base coaxially aligned with the motor shaft, and in which an access opening is provided on that side face of a tape guide cylinder at which it is not in contact with a moving magnetic tape so that the head mounting base can solely be taken out during replacement of magnetic heads without any trouble of dismounting the tape guide cylinder and other members.

A further object of the present invention is to provide a magnetic recording and reproducing apparatus of the above character in which a pin is provided in an axial bore in the flange and is urged by a spring to protrude upwardly through the upper central face of the flange securely fixed to the motor shaft which drives the head mounting base, a central perforation is provided at the center of rotation of the head mounting base for receiving therein the pin, and an access opening is provided on that side face of the tape guide cylinder at which it is not in contact with a moving magnetic tape, so that replacement of magnetic heads can be attained by solely taking the head mounting base outwardly of the tape guide cylinder and replacing in position therein without any trouble of dismounting the tape guide cylinder and other members.

A still further object of the present invention is to provide a magnetic recording and reproducing apparatus of the above character comprising a joining member which is provided at one end thereof with a shaft having slip rings thereon and at the other end thereof with a shaft which extends through the central perforation at the center of rotation of the head mounting base into the axial bore of the flange for engagement therewith, so that the center of rotation of the head mounting base can coaxially be connected with the motor shaft during mounting of the head mounting base on the flange.

A yet further object of the present invention is to provide a magnetic recording and reproducing apparatus of the above character which is provided with means for resiliently mounting on the flange the joining member having the joining shaft and the shaft having slip rings thereon, so that the joining shaft for coaxially connecting the center of rotation of the head mounting base with the motor shaft can easily be disengaged from the central perforation of the head mounting base and from the motor shaft receiving axial bore of the flange during the replacement of the head mounting base.

Another object of the present invention is to provide a magnetic recording and reproducing apparatus of the above character in which, in order to effect detachable mounting of the central portion of the head mounting base on the flange securely fixed to the motor shaft, to insure equal horizontal positions of two magnetic heads on the head mounting base with respect to each other, and to have the tips of the heads equally spaced from the center of the motor shaft, means such as a cut-out on the motor shaft and a cut-out in the central perforation of the head mounting base are provided so that angular relation of the cut-outs with respect to each other is utilized to attain disengagement of the motor shaft from the central perforation of the head mounting base by parallel movement of the head mounting base in its plane.

Still another object of the present invention is to provide a magnetic recording and reproducing apparatus of the above character which is provided with a rotary disc of flexible material split into two substantially semicircular sectors for detachable mounting on opposite sides of the head mounting base.

A further object of the present invention is to provide a magnetic recording and reproducing apparatus of the above character in which, in order that the head mounting base disposed on the rotary disc can detachably be mounted on the flange securely fixed to the motor shaft, means such as annular projections of large and small diameter are provided on the flange upper face so that detachable mounting of the head mounting base on the flange is effected in a manner that the annular projection of large diameter is first engaged in a central perforation of the rotary disc having a diameter larger than that of the central perforation of the head mounting base and the annular projection of small diameter is then engaged in the central perforation of the head mounting base.

A still further object of the present invention is to provide a magnetic recording and reproducing apparatus of the above character in which, in order to insure the rotation of the tips of two magnetic heads in the same plane, means are provided to securely fix all of the rotary disc, head mounting base, head mounting sub-bases carrying thereon the magnetic heads, and tips of the magnetic heads in the same plane.

Another object of the present invention is to provide a magnetic recording and reproducing apparatus of the above character in which, in order to insure the rotation of the tips of two magnetic heads in the same plane, the head mounting sub-bases carrying thereon the magnetic heads are firmly held between finished peripheral edge portions of the rotary disc and bent end portions of the head mounting base.

The above and other objects, advantages and features of the present invention will become apparent from the following description illustrating preferred embodiments of the invention in detail with reference to the accompanying drawings.

Figures 1, 2, 3A, 3B:
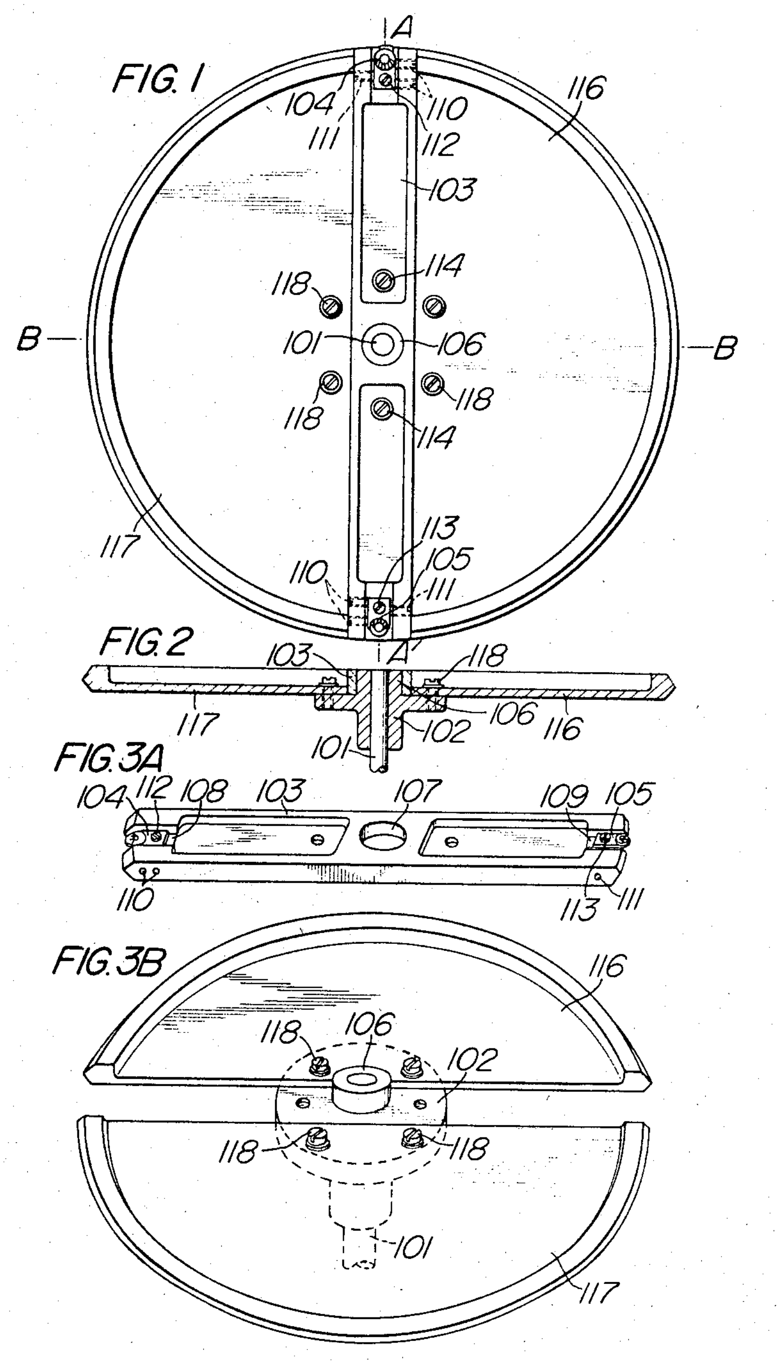
FIG. 1 is a top plan view of a rotary head device in the magnetic recording and reproducing apparatus having a rotatable head mounting base according to the present invention.
FIG. 2 is a section taken on the line B–B′ in FIG. 1.
FIGS. 3A and 3B are an exploded view of parts of the rotary head device shown in FIG. 1.

The present invention as shown in FIG. 1 and the succeeding drawings provides a magnetic recording and reproducing apparatus in which a rotatable head mounting base of substantially rectangular shape having magnetic heads mounted on opposite ends thereof is detachably mounted at its central portion on a flange securely fixed to a motor shaft which causes the rotation of the head mounting base. Though the previous description has referred to prior methods to a certain extent, a further detailed explanation of those prior methods will assist in the better understanding of the novel features of the present invention which will later be described in further details.

In the present description, a typical example of the prior methods will be described although there are several examples of such methods. The prior method cited herein employs an arrangement in which magnetic heads scan a tape at an angle with respect thereto and is described in considerable detail, for example, on pages 868 to 871 of "Journal of the S.M.P.T.E." December, 1960. An outline of the mechanism employed therein will be given hereunder though it may be too conceptive.

Figure 33:
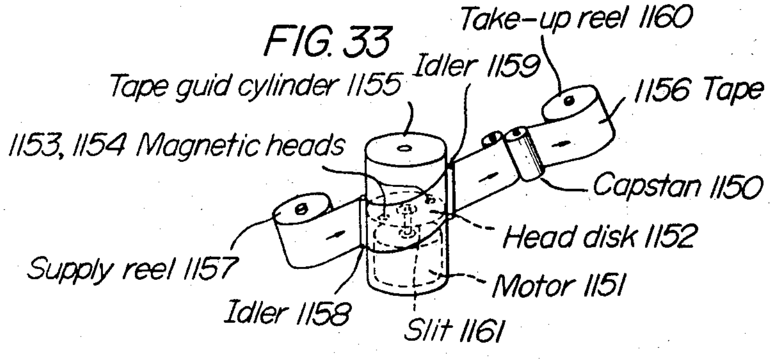
FIG. 33 is a schematic explanatory view showing an arrangement of a prior apparatus for recording and reproducing a road-band video signal, said apparatus having a rotary head device in which two magnetic heads are mounted on a rotary disc.

The prior method described above is used with an arrangement as shown in FIG. 33 and will be described with reference to the drawing. In FIG. 33, a head disc 1152 accommodating two magnetic heads 1153 and 1154 therein is adapted to be driven by a synchronous motor 1151, and is rotated by a motor 1151 at a rate of 1,800 r.p.m. These members are entirely accommodated within a tape guide cylinder 1155 and the magnetic heads 1153 and 1154 rotate in the cylinder 1155 with their tips protruding outwardly through a slit 1161 on the surface of the tape guide cylinder 1155. A magnetic tape 1156 is paid off a supply reel 1157, is fed past a first idler 1158 to abut the tape guide cylinder 1155, and after travelling half round the cylinder, is fed past a second idler 1159 and a capstan 1150 to be taken up on a take-up reel 1160. During the travel of the tape 1156 half round the tape guide cylinder 1155, the two magnetic heads 1153 and 1154 mounted at diametrically symmetrical positions on the rotary head disc 1152 linearly sweep the tape 1156 to attain the recording of a television signal on the tape.

In this method, the two magnetic heads are mounted on the periphery of the rotary head disc in 180° spaced apart relation, but it has been generally extremely difficult to provide a plurality of magnetic head units, that is, magnetic transducer units on the periphery of the rotary disc in definite angular relation with respect to each other. Or more precisely, an extremely high degree of mechanical accuracy has been required during mounting a magnetic heads on the rotary disc in the assembling step in that all of the heads must protrude an equal length while having a same height and must be equally spaced on the periphery of the rotary disc. Thus it has been extremely difficult to simultaneously satisfy these three requirements and a lot of time has generally been wasted when replacement of magnetic heads is required due to wear and other reasons. Further it has not been an easy operation to fasten the rotary disc to the motor shaft driving the same with the center of the rotary disc aligned with the axis of the motor shaft. Even if the center of the rotary disc were fastened to the motor shaft in axially aligned relation, another difficulty as described above resulting from the severe requirements for mounting the head units on the periphery of the rotary disc is still left to be solved. These difficulties provide a great hindrance to the initial assembling of magnetic recording and reproducing apparatus, not to speak of the difficulty involved in the replacement of magnetic head units.

The present invention provides a magnetic recording and reproducing apparatus having a rotary head device which is quite free from those drawbacks involved in the prior method and will now be described in full details.

An embodiment of the present invention will first be described with reference to FIGS. 1 to 3. The rotary head device according to the invention includes a head mounting base 103 of substantially rectangular shape which is fixedly mounted on a flange 102 fixed to a motor shaft 101. Two magnetic heads 104 and 105 are mounted on opposite ends of the head mounting base 103. A perforation 107 is provided at the center of the head mounting base 103 in a manner that it opposes to a projection 106 provided on the upper face of the flange 102. The two magnetic heads 104 and 105 are received in respective slots 108 and 109 provided at opposite ends of the head mounting base 103 and are held in position by adjusting screws 110 and 111 passed through both side walls of the respective slots 108 and 109. In assembling, the magnetic heads 104 and 105 must be positioned in a manner that the centers thereof lie on the straight line passing through the center of the head mounting base 103, that is, the line A–A′ in FIG. 1 and that the tips thereof are spaced a predetermined outside diameter from each other. Then, the magnetic heads 104 and 105 are secured to the head mounting base 103 by respective set screws 112 and 113. Thereafter the perforation 107 provided at the center of the head mounting base 103 is engaged with the projection 106 provided on the upper face of the flange 102 and is secured to the latter by screws 114. Then two rotary disc sectors 116 and 117 of substantially semicircular shape are fixed to the flange 102 by fastening screws 118 on opposite sides of the head mounting base 103 in abutting relation therewith to form a rotary head disc.

It will thus be known that, according to the invention, the heads are not directly mounted on the rotary disc but are mounted on the head mounting base with required tolerance and this head mounting base is arranged to be replaced with the magnetic heads fixed thereon, that is to say, the two magnetic heads can be handled as an integral unit. This structure provides simplified head mounting operation during replacement thereof, insures more accurate mounting of the heads than with the mounting of the heads directly on the disc face, and obviates the necessity of such high degree of mechanical accuracy for the disc sectors 116 and 117 as has been the case with prior structure.

Figure 4:
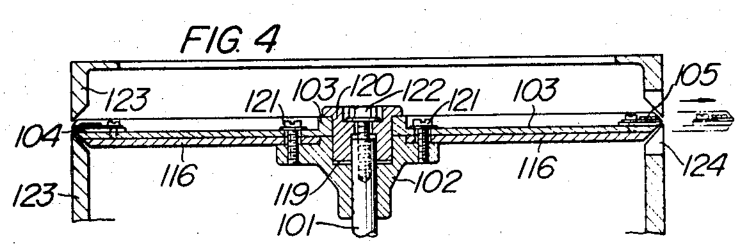
FIG. 4 is a sectional side elevational view of a modification of the rotary head device shown in FIG. 1.

The structure shown in FIGS. 1 to 3 may be modified as shown in FIG. 4. In FIG. 4, the central portion of the flange 102 is recessed as at 119 and the head mounting base 103 is mounted on the flange 102 by means of a bushing 120 and screws 121 and 122. An opening 124 of a size which allows for the insertion of the head mounting base 103 is provided on the side wall of a tape guide cylinder 123 so that the head mounting base 103 can be taken out of and placed in position in the tape guide cylinder 123 through this opening 124. This structure is advantageous in that the head mounting base 103 can be replaced without dismounting the tape guide cylinder 123 and thus a time required for the reassembling and adjustment of the tape guide cylinder 123 can be eliminated.

Figures 5, 6A, 6B:
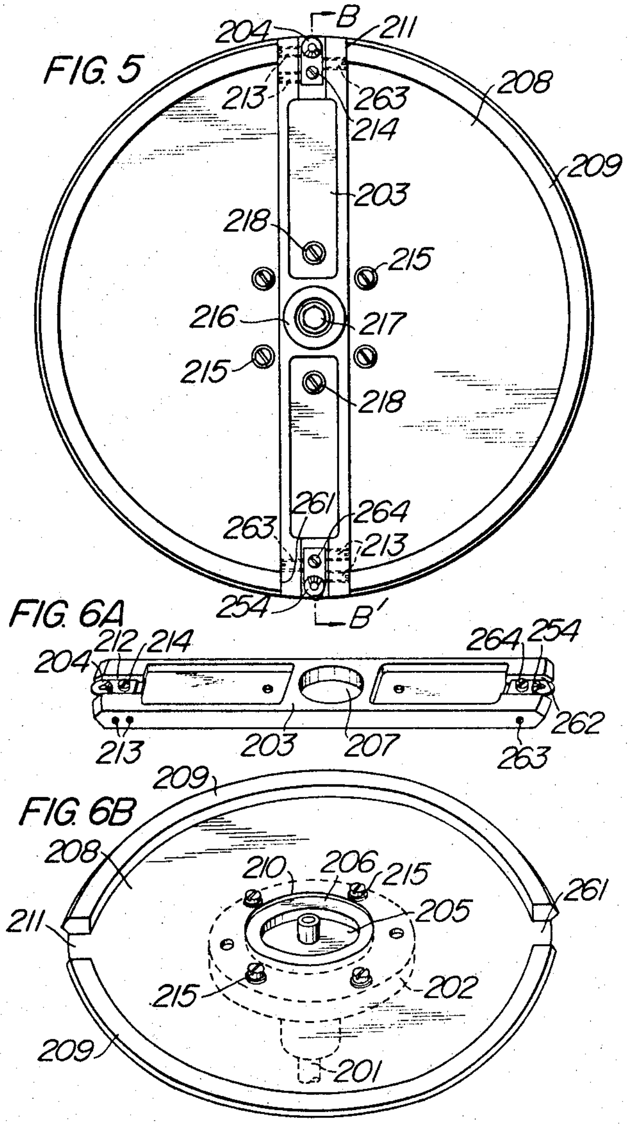
FIG. 5 is a top plan view of another embodiment of the rotary head device in the magnetic recording and reproducing apparatus having a rotary disc and a rotatable head mounting base according to the present invention.
FIGS. 6A and 6B are an exploded view of parts of the rotary head device of FIG. 5.

Referring to FIGS. 5 and 6 showing another embodiment according to the present invention, a flange 202 is fixed to a motor shaft 201. A head mounting base 203 of substantially rectangular shape having magnetic heads 204 and 254 mounted on opposite ends thereof is provided with a central perforation 207, which is in abutment with an annular projection 206 provided about a recess 205 formed on the upper face of the flange 202 and is opposed by the recess 205. The periphery of a rotary disc 208 is projected upwardly to form an annular ridge 209 and a perforation 210 is provided at the center of the rotary disc 208 for engagement with the annular projection 206 on the flange 202. The rotary disc 208 is further provided at its diametrical end edges with cut-outs 211 and 261 of a width slightly greater than that of the head mounting base 203 to accommodate therein the opposite ends of the head mounting base 203.

In assembling the device as shown in FIGS. 5 and 6, the magnetic heads 204 and 254 are placed in respective slots 212 and 262 disposed on opposite ends of the head mounting base 203 and are suitably set in position by adjusting screws 213 and 263 passed through both side walls of the respective slots 212 and 262. In this case, the magnetic heads 204 and 254 must be positioned so that the centers thereof lie on the straight line passing through the center of the head mounting base 203, that is, the line B–B′ in FIG. 5 and so that the tips of the heads are spaced a predetermined outside diameter from each other. Then the magnetic heads 204 and 254 are fixed to the head mounting base 203 by respective set screws 214 and 264. The perforation 210 at the center of the rotary disc 208 is then engaged with the annular projection 206 on the flange 202 and the disc 208 is secured to the flange 202 by fastening screws 215. Thereafter the head mounting base 203 is placed on the rotary disc 208 with the opposite ends of the former disposed in the respective cut-outs 211 and 261 of the latter, and a bushing 216 is inserted through the perforation 207 into the recess 205 of the flange 202, then the head mounting base 203 is secured to the disc 208 by a set screw 217 and fastening screws 218.

Figures 7, 8, 9, 10:
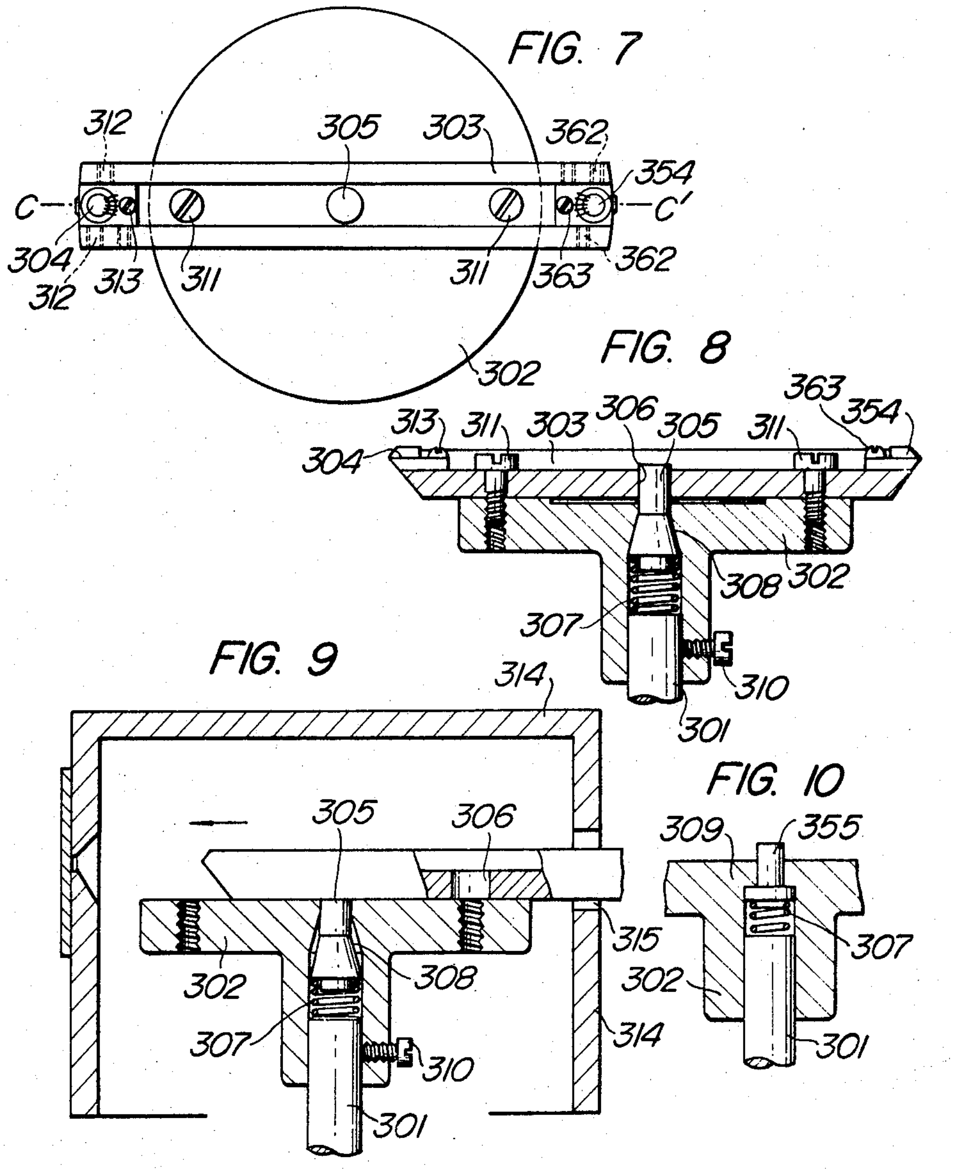
FIG. 7 is a top plan view of still another embodiment of the rotary head device in the magnetic recording and reproducing apparatus having a rotatable head mounting base according to the present invention.
FIG. 8 is a sectional side view taken on the line C–C′ in FIG. 7.
FIG. 9 is a view substantially similar to FIG. 8 but showing the head mounting base in the course of being dismounted.
FIG. 10 is a sectional side view of part of a modification of the rotary head device shown in FIG. 7.

Still another embodiment of the present invention is shown in FIGS. 7 to 10. In this embodiment, a flange 302 is fixed to a motor shaft 301 by a fixing screw 310. A head mounting base 303 of substantially rectangular shape having magnetic heads 304 and 354 mounted on opposite ends thereof is provided at its central portion with a perforation 306 to receive therein a pin 305 projecting upwardly through the flange 302. In an upper space in an axial bore of the flange 302 defined above the motor shaft 301 there is disposed a coil spring 307 which normally urges the pin 305 upwardly above the upper face of the flange 302. The pin 305 is provided with a tapered portion 308 which is operative to continuously center the pin 305 in the axial bore and to prevent the pin 305 to jump outwardly. In a modification as shown in FIG. 10, a pin 355 is not provided with such tapered portion 308 and instead a shoulder 309 is provided in the flange 302 to attain the similar effect. The head mounting base 303 is fixed to the flange 302 by set screws 311. In assembling, the magnetic heads 304 and 354 are mounted on the opposite ends of the head mounting base 303 and held in position by adjusting screws 312 and 362 abutting therewith through both side walls of the head mounting base 303. In this case, the magnetic heads 304 and 354 must be positioned so that the centers thereof lie on the straight line passing through the center of the head mounting base 303, that is, the line C–C′ in FIG. 7 and so that the tips thereof are spaced a predetermined outside diameter from each other. Then the magnetic heads 304 and 354 are fixed to the head mounting base 303 by respective set screws 313 and 363. Then the flange 302 is secured to the motor shaft 301 for conjoint rotation therewith and is disposed within a tape guide cylinder 314. The pin 305 protrudes above the upper face of the flange 302 by being urged by the coil spring 307 in coaxial relation with the motor shaft 301. To permit detachable mounting of the head mounting base 303 in position in the tape guide cylinder 314, an opening 315 is provided at the side wall of the tape guide cylinder 314 as shown in FIG. 9. In mounting the head mounting base 303, it is inserted into the tape guide cylinder 314 through the opening 315 and is slid on the flange 302 while forcing the pin 305 downwardly against the force of the coil spring 307 until the pin 305 is fitted in the central perforation 306 of the head mounting base 303. Then the head mounting base 303 is fixed to the flange 302 by the set screws 311. Thus, the motor shaft 301 and the head mounting base 303 are set in position in axially aligning relation. In dismounting the head mounting base 303 for the purpose of head replacement or the like, the pin 305 is urged downwardly and the head mounting base 303 is withdrawn through the opening 315 of the tape guide cylinder 314.

Figures 11, 12, 13, 14:
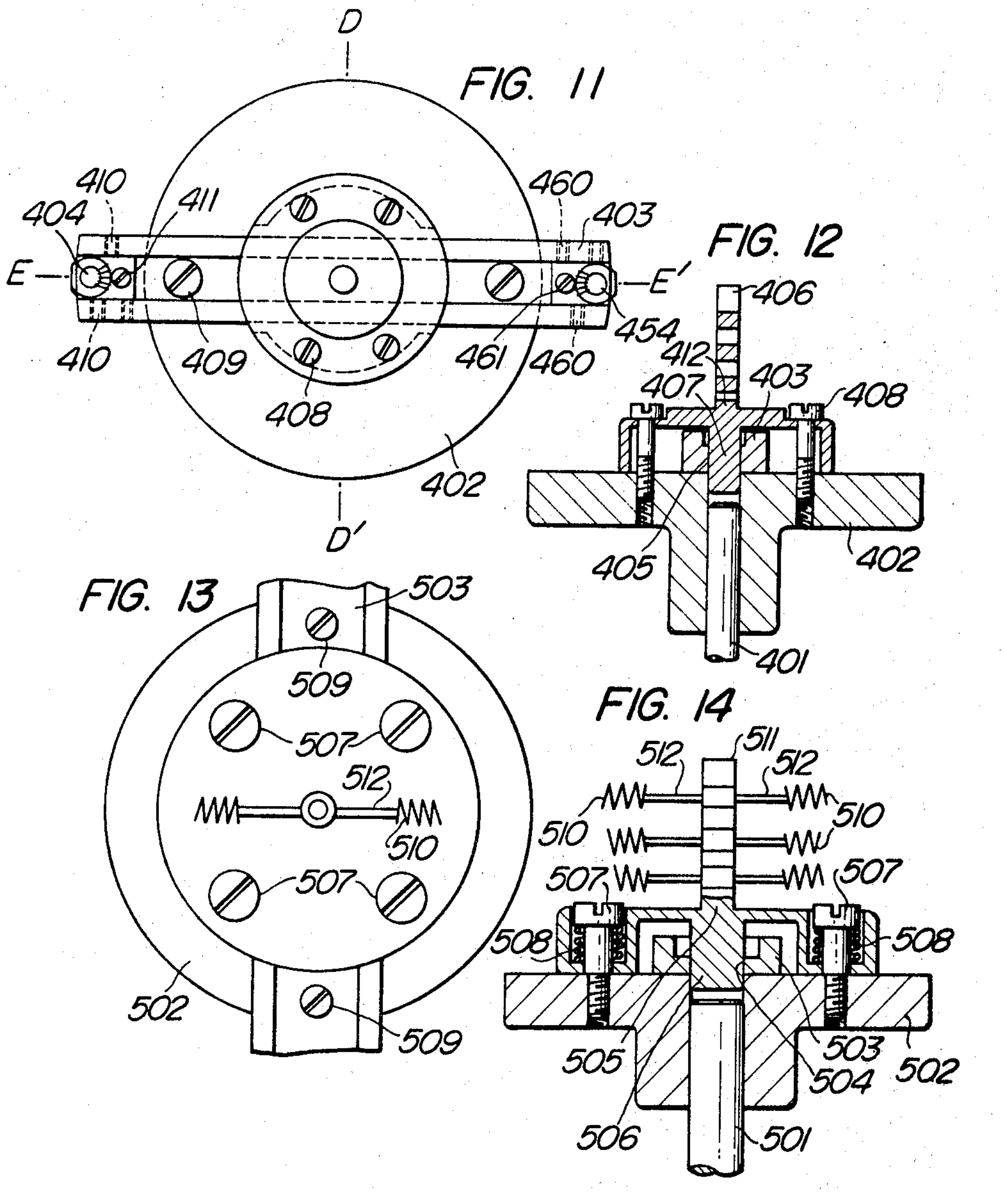
FIG. 11 is a top plan view of yet another embodiment of the rotary head device in the magnetic recording and reproducing apparatus having a rotatable head mounting base according to the present invention.
FIG. 12 is a sectional side view taken on the line D–D′ in FIG. 11.
FIG. 13 is a top plan view of a further embodiment of the rotary head device having a rotatable head mounting base according to the present invention.
FIG. 14 is a sectional side view of the device shown in FIG. 13.

A further embodiment of the present invention is shown in FIGS. 11 and 12. A flange 402 is fixedly mounted on a motor shaft 401 for unitary rotation therewith. A head mounting base 403 of substantially rectangular shape having magnetic heads 404 and 454 mounted on opposite ends thereof is provided at its central portion with a perforation 405 which is of the same diameter with that of the axial bore of the flange 302 receiving therein the motor shaft 401. A joining member 412 is provided at one end thereof with a shaft 406 having slip rings for deriving the output from the magnetic heads 404 and 454 and at the other end with a shaft 407 for joining the head mounting base 403 to the flange 402. The shaft 407 is finished to the entirely same diameter with that of the motor shaft 401 and is fitted from above the upper face of the flange 402 into the axial bore in the flange 402 in opposed relation to the motor shaft 401, while an annular depending leg of the joining member 412 is forced on the upper face of the flange 402 in a manner to hold therein the head mounting base 403. Set screws 408 and 409 fix the joining member 412 and the head mounting base 403 to the flange 402, respectively.

In assembling, at first the magnetic heads 404 and 454 are mounted on opposite ends of the head mounting base 403 and held in position by adjusting screws 410 and 460 abutting therewith through both side walls of the base 403. In this case, the magnetic heads 404 and 454 must be positioned so that the centers thereof lie on the straight line passing through the center of the head mounting base 403, that is, the line E–E′ in FIG. 11 and so that the tips thereof are spaced a predetermined outside diameter from each other. Then the magnetic heads 404 and 454 are fixed to the head mounting base 403 by respective set screws 411 and 461. Then, the flange 402 is mounted on the motor shaft 401 in a manner to leave a space at the upper part of the axial bore of the flange 402. The head mounting base 403 is then placed on the flange 402 and is secured thereto by the joining shaft 407. The joining member 412 is then fastened to the flange 402 by the set screws 408, and the head mounting base 403 is secured to the flange 402 by the set screws 409. From the above description it will be understood that, in this embodiment, the magnetic heads are not directly mounted on a rotary disc with high accuracy but are mounted with predetermined tolerance on the head mounting base which in turn is fixed to the flange. Therefore, the head mounting base is provided with a central perforation which is of the same diameter with that of the motor shaft and the joining member is likewise provided with a shaft having the same diameter with that of the motor shaft.

Figure 15:
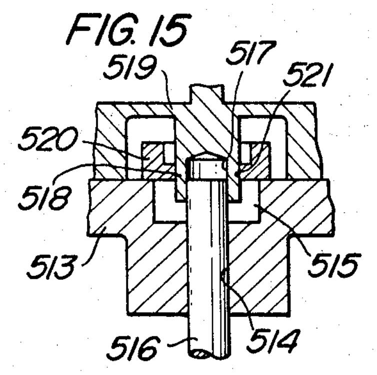
FIG. 15 is a sectional side view of part of a modification of the device shown in FIG. 13.

Referring to FIGS. 13 to 15 showing a still further embodiment of the present invention, a flange 502 is mounted on a motor shaft 501 for unitary rotation therewith. A head mounting base 503 of substantially rectangular shape having magnetic heads mounted on opposite ends thereof is provided at its central portion with a perforation 504 of the same diameter with that of an axial bore of the flange 502 in which the motor shaft 501 is received. A joining member 505 is provided at one end thereof with a shaft 511 having slip rings for deriving the output from the magnetic heads and at the other end with a shaft 506 for joining the head mounting base 503 to the flange 502. The shaft 506 is finished to the entirely same diameter with that of the motor shaft 501 and extends through the central perforation 504 of the head mounting base 503 into the axial bore of the flange 502 in opposed relation to the motor shaft 501. Set screws 507 fix the joining member 505 on the flange 502 with coil springs 508 coiled about the screws. Set screws 509 fasten the head mounting base 503 to the flange 502. Coil springs 510 urge brushes 512 onto the slip rings on the shaft 511 of the joining member 505.

In mounting the head mounting base 503 on the flange 502, the joining member 505 is pulled upwardly against the force of the coil springs 508 to move the joining shaft 506 upwardly away from the bore of the flange 502. Under this state, the head mounting base 503 is inserted below the joining member 505 until the central perforation 504 thereof is in axial registry with the motor shaft 501 and then the joining shaft 506 is passed through the perforation 504 into the axial bore of the flange 502. Then the head mounting base 503 is fixed in position on the flange 502 by the set screws 509. The joining shaft 506 is positively held in position in the central perforation 504 of the head mounting base 503 by the force of the coil springs 508.

The method of mounting the joining member on the flange by means of springs is not limited to the one as shown in FIGS. 13 and 14, and in some cases such springs may be disposed below the flange to attain the similar effect. The structure shown in FIGS. 13 and 14 may be modified as shown in FIG. 15. In the structure of FIG. 15, an enlarged diameter bore portion 515 is provided at the upper part of a central bore 514 of a flange 513, while a joining member 519 is provided with a shaft 518 which is adapted to protrude into the enlarged diameter bore portion 515 of the flange 513 and has a recess 517 to receive therein the top end of a motor shaft 516. This shaft 518 extends through a central perforation 521 of a head mounting base 520.

A yet further embodiment of the present invention will next be described with reference to FIGS. 16 to 18. In practising the present invention, it is necessary that head tips of two magnetic heads mounted on opposite ends of a head mounting base of substantially rectangular shape are adapted to rotate in the same plane and that, even when this head mounting base having the magnetic heads mounted on the opposite ends thereof is replaced by another head mounting base with other magnetic heads thereon, the head tips of the two magnetic heads on the new head mounting base also rotate in the same plane. In other words, the head mounting bases must have interchangeability with each other. It is also necessary that the head tips of the magnetic heads on the head mounting base travel along the same circular path when the motor shaft is fixed to the center of the head mounting base at right angle with respect thereto and is rotated. In other words, it is required that the head tips of the magnetic heads on the head mounting base are spaced a same distance from the center of the central perforation of the head mounting base receiving the motor shaft therein.

Figure 16:
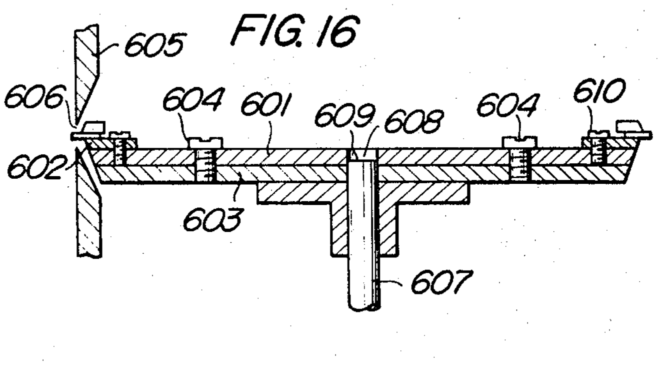
FIG. 16 is a sectional side view of a still further embodiment of the rotary head device according to the present invention.

For this purpose, in the structure of FIG. 16 the head mounting base 601 is secured to a motor shaft 607 directly pulled thereon, said shaft 607 being slightly projected above a rotary disc 603. The head tips of the magnetic heads 602 must protrude slightly outwardly from a tape guide cylinder 605, which therefore is provided with a slit 606 whose aperture is slightly larger than the thickness of the head tips. In this structure, dismounting of the head mounting base 601 for replacement of the magnetic heads 602 is effected in the following manner.

At first the set screws 604 are unscrewed and then the head mounting base 601 is raised upwardly. In this case said base 601 is restricted within the width of the slit 606 and this makes the fitted portion of the shaft 607 into the base 601 shorter. Furthermore, it is considered that upon the exchanging of the magnetic head 602 it contacts with the edges of the slit 606 and hence this operation is difficult.

Figure 17:
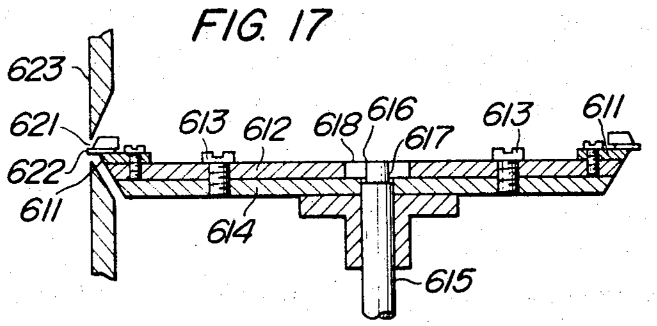
FIG. 17 is a sectional side view of an improvement of the device shown in FIG 16.
Figure 18:
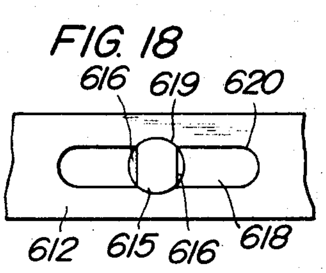
FIG. 18 is an enlarged plan view of part of the device shown in FIG 17.

In contrast to the above, the embodiment shown in FIGS. 17 and 18 provides an improved method for giving convenient interfit between a motor shaft and a central perforation of a head mounting base. In this embodiment, magnetic heads 611 are fixed on opposite ends of a head mounting base 612 of substantially rectangular shape by set screws. This head mounting base 612 is fixed on a rotary disc 614 by fixing screws 613. The rotary disc 614 is provided centrally thereof with a perforation 616 in which a motor shaft 615 is fitted and fixed. The top end 617 of the motor shaft 615 is formed with opposite cutouts which are cut in parallel and symmetrical relation with respect to the axis of the motor shaft 615. The head mounting base 612 is provided with a central perforation 618 consisting of a large diameter portion 619 in which the cut-out end 617 of the motor shaft 615 can fit at whatever angular position thereof and small diameter portions 620 which are disposed on opposite sides of the large diameter portion 619 and in which the cut-out end 617 can only fit at a certain angular position thereof. A slit 621 is provided on a tape guide cylinder 623 so that the head tips of the magnetic heads 611 can protrude outwardly therefrom. By virtue of the structure as described above, the head mounting base 612 can easily be withdrawn upwardly in the following manner without any fear of the head tip 622 of the magnetic head 611 abutting with the slit 621 of the tape guide cylinder 623. To do this, the fixing screws 613 fastening the head mounting base 612 to the rotary disc 614 are removed at first and either the head mounting base 612 or the rotary disc 614 is turned through an angle of 90° relative to the other which is fixed in place. By thus turning, the cut-out end 617 of the motor shaft 615 can now fit in one of the small diameter portions 620 of the central perforation 618 of the head mounting base 612, which can thereby be allowed to slide in parallel with the plane of the rotary disc 614 and can easily be withdrawn upwardly. It will be understood from the above description that the top end of the motor shaft can easily be fitted, by a mere sliding movement of the head mounting base in its plane, into the central perforation of the head mounting base carrying on opposite ends thereof two magnetic heads which are suitably fixed by preliminarily measuring the distance between their head tips so as to provide a predetermined dimension. Therefore it is possible to easily determine the center of rotation of the rotary heads with high accuracy and to obtain a high degree of interchangeability between head mounting bases.

Figures 19, 20A, 20B:
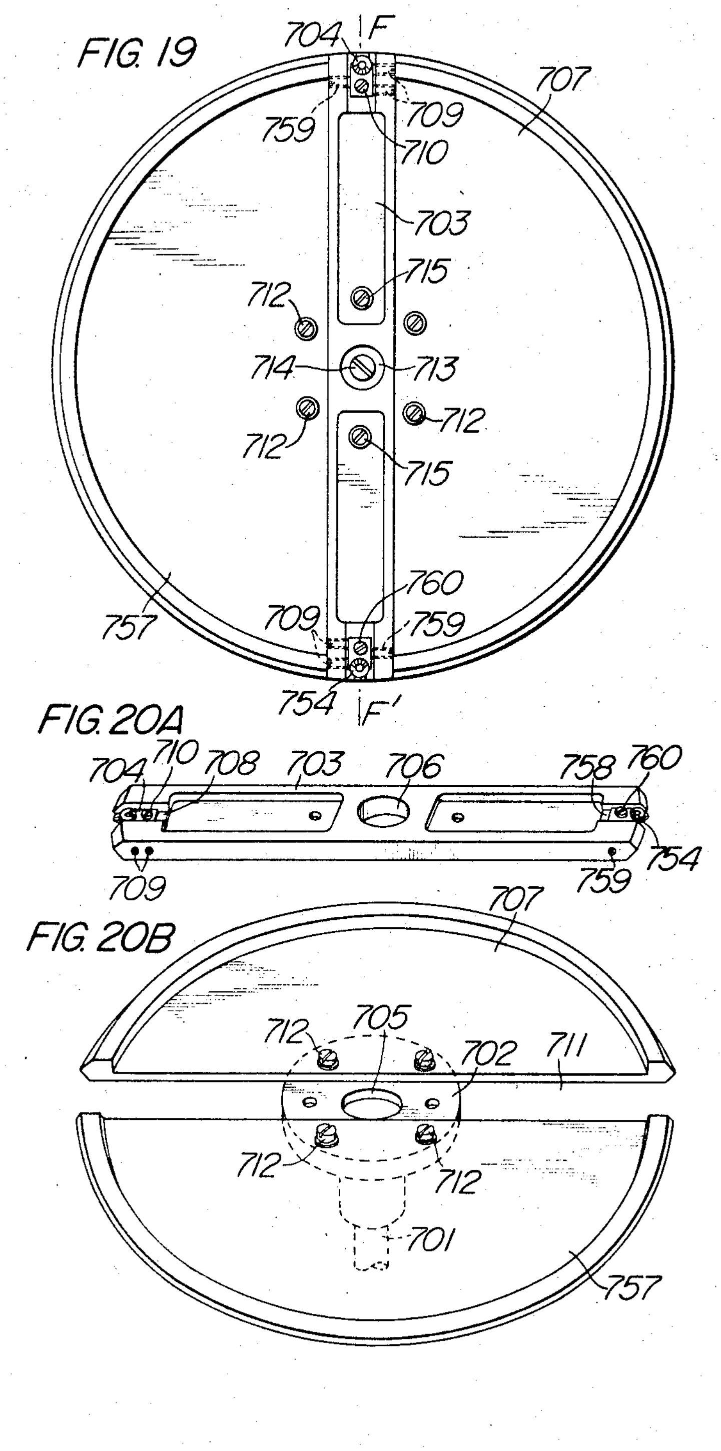
FIG. 19 is a top plan view of a yet further embodiment of the rotary head device according to the present invention.
FIGS 20A and 20B are an exploded view of parts of the rotary head device shown in FIG. 19.
Figure 21:
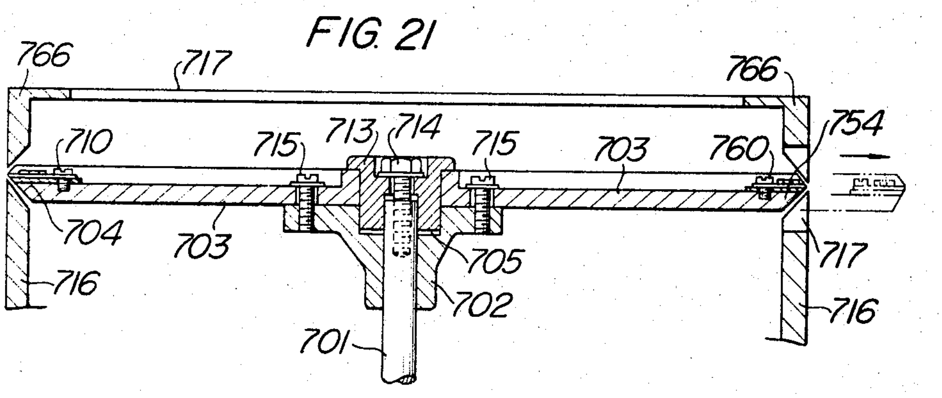
FIG. 21 is a sectional side view taken on the line F–F′ in FIG. 19.
Figure 26:
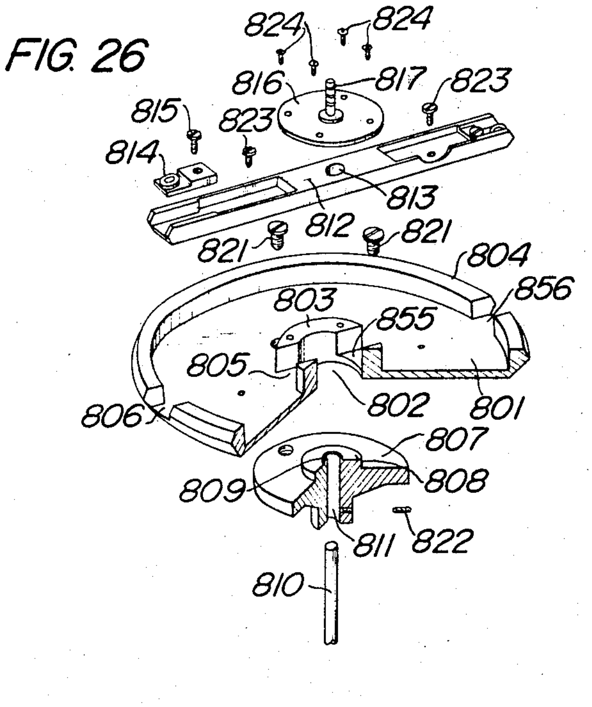
FIG. 26 is an exploded view of parts of the device shown in FIG. 22.
Figure 22:
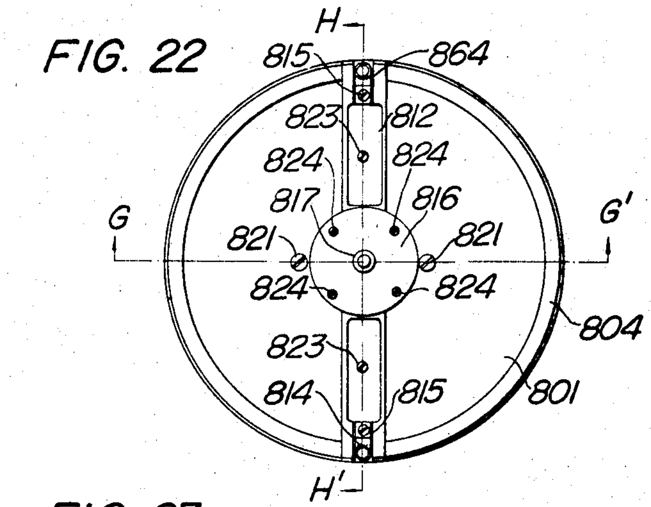
FIG. 22 is a top plan view of another embodiment of the rotary head device according to the present invention.
Figure 23:
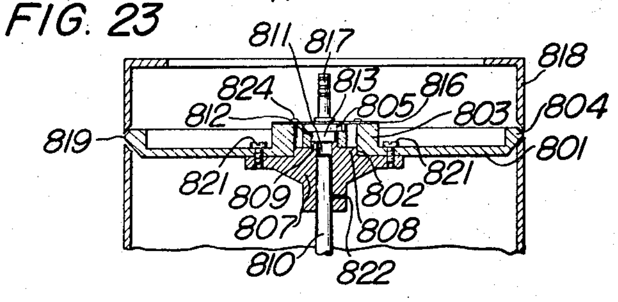
FIG. 23 is a sectional side view taken on the line G–G′ in FIG. 22.
Figure 24:
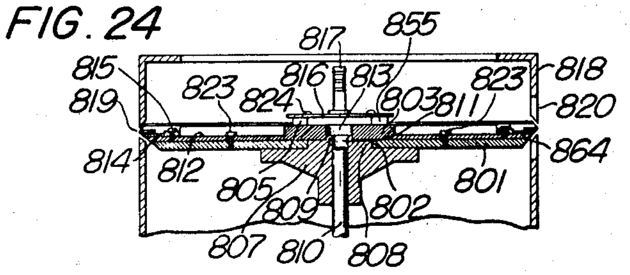
FIG. 24 is also a sectional side view taken on the line H–H′ in FIG. 22.

Referring to FIGS. 19 to 21 showing another embodiment according to the present invention, a flange 702 is mounted on a motor shaft 701 for unitary rotation therewith. A head mounting base 703 of substantially rectangular shape having magnetic heads 704 and 754 mounted on opposite ends thereof is provided with a central perforation 706 which is disposed opposite a recess 705 formed on the upper face of the flange 702. Rotary disc sectors 707 and 757 of substantially semicircular shape are made of a flexible material such as synthetic resin. In assembling the structure as shown, the magnetic heads 704 and 754 are placed in respective slots 708 and 758 provided at opposite ends of the head mounting base 703 and held in position by adjusting screws 709 and 759 passed through both side walls of the respective slots 708 and 758. In this case, the magnetic heads 704 and 754 must be so positioned that the centers thereof lie on the straight line passing through the center of the head mounting base 703, that is, the line F–F′ in FIG. 19 and so that the tips thereof are spaced from each other a predetermined outside diameter. Then the magnetic heads 704 and 754 are fixed on the head mounting base 703 by respective set screws 710 and 760.

The rotary head disc sectors 707 and 757 of substantially semicircular shape are then fixed to the flange 702 by fastening screws 712 in a manner that a space 711 of a width slightly larger than that of the head mounting base 703 is defined therebetween. Thereafter, the head mounting base 703 having the magnetic heads mounted thereon is placed in the space 711, a bushing 713 is passed through the central perforation 706 of the head mounting base 703 into the recess 705 of the flange 702, and the head mounting base 703 is fastened to the flange 702 by a set screw 714 and fastening screws 715. The flexible nature of the rotary disc as described above is quite advantageous in that the rotary disc can suitably be bent to be taken out of and replaced in position in a tape guide cylinder 716 through an aperture 717 disposed at an upper part of the tape guide cylinder 716 without dismantling an upper part 766 of the tape guide cylinder 716.

Referring to FIGS. 22 to 26 illustrating still another embodiment according to the present invention, a rotary disc 801 is provided with a circular perforation 802 of small diameter at its central portion, an annular ridge 803 of small diameter surrounding the circular perforation 802, and an annular ridge 804 of large diameter disposed on the outer periphery of the disc 801. A pair of opposed positioning grooves 805 and 855 and a pair of opposed guide grooves 806 and 856 are bored through the annular ridges 803 and 804, respectively, in a manner that the positioning grooves 805 and 855 and the guide grooves 806 and 856 are disposed opposite to each other on the diameter of the rotary disc 801. Centrally of the upper face of a discoidal flange 807 which is coaxially coupled to the rotary disc 801, there are provided an annular projection 808 of large diameter and an annular positioning projection 809 of diameter smaller than the former in concentrical relation with each other, the latter projection extending slightly above the former. A motor shaft 810 is received and fixed in position in a central axial bore 811 of the flange 807. A head mounting base 812 of substantially rectangular shape which is to be disposed on the rotary disc 801 is provided centrally thereof with a circular positioning hole 813 to receive therein the annular positioning projection 809 of the flange 807. Magnetic heads 814 and 864 are fixed on opposite ends of the head mounting base 812 by set screws 815. On the annular ridge 803 of the rotary disc 801, there is mounted a slip ring mounting plate 816 which is provided at its upper central portion with a shaft 817 for mounting slip rings thereon. A tape guide cylinder 818 enclosing the rotary disc 801 therein is provided on its outer peripheral face with a slit 819 which extends over about the half circumference so that the tips of the magnetic heads 814 and 864 can protrude through the slit 819. At a portion on that side wall of the tape guide cylinder 818 which is not contacted by a moving magnetic tape, there is provided an access opening 820 for the head mounting base 812. The annular ridge 803 of large diameter described above has a height greater than that of the magnetic head mounting base 812.

The rotary head device having the structure as described above can be assembled in the following manner. At first, the annular projection 808 of the discoidal flange 807 is fitted in the circular perforation of the rotary disc 801 and the flange 807 is fixed to the rotary disc 801 by fastening screws 821. Then the motor shaft 810 is forced into the central axial bore 811 of the flange 807 and secured thereto by a set screw 822. The head mounting base 812 is then placed in the positioning grooves 805 and 855 of the annular ridge 803 and the guide grooves 806 and 856 of the annular ridge 804 of the rotary disc 801, with the circular positioning hole 813 at the center of the head mounting base 812 simultaneously engaged with the annular projection 809 of the flange 807. Thereafter the head mounting base 812 is fastened to the rotary disc 801 by two fastening screws 823. The slip ring mounting plate 816 is then fastened on the upper face of the annular ridge 803 of the rotary disc 801 by four fastening screws 824.

Figure 25:
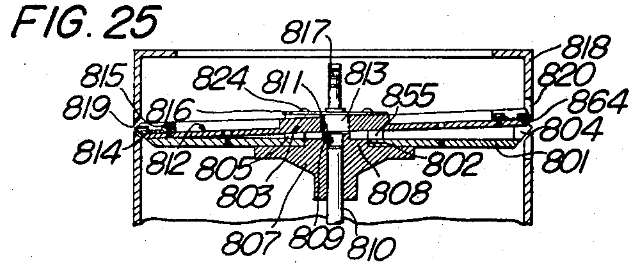
FIG. 25 is a view similar to FIG. 24 but showing the manner of dismounting the head mounting base in the device of FIG. 22.

Dismounting of the head mounting base 812 for the purpose of head replacement can be effected in a manner as described below. At first, the two fastening screws 823 are removed and the magnetic head mounting base 812 having the magnetic heads 814 and 864 fixed on opposite ends thereof is lifted at an angle with respect to the rotary disc 801 as shown in FIG. 25 to disengage the circular positioning hole 813 of the mounting base 812 from the annular projection 809 of the flange 807. After the above steps, the head mounting base 812 may be moved in a direction of arrow as shown to be taken out of the tape guide cylinder 818 through the access opening 820. Thus the replacing operation of the magnetic heads 814 and 864 can easily be effected. In replacing the magnetic heads 814 and 864 in proper position in the tape guide cylinder 818, the head mounting base 812 having these heads preliminarily fixed on opposite ends thereof may be merely fitted in the positioning grooves 805 and 855 of the annular ridge 803 of the rotary disc 801 and the circular positioning hole 813 of the head mounting base 812 may be fitted on the annular projection 809 of the flange 807, then the head mounting base 812 may be fixed to the rotary disc 801 by the fastening screws 823. Thus, it is possible to accurately place the magnetic heads 814 and 864 in their normal operative positions at the opposite diametral ends of the rotary disc 801.

Yet another embodiment according to the present invention will next be described with reference to FIGS. 27 to 29. As described previously, the head tips of two magnetic heads fixed on a head mounting base must rotate in the same plane. With respect to this requirement, a structure shown in FIG. 27 analogous to the previously described structure of FIGS. 5 and 6 will first be discussed.

Figure 27:
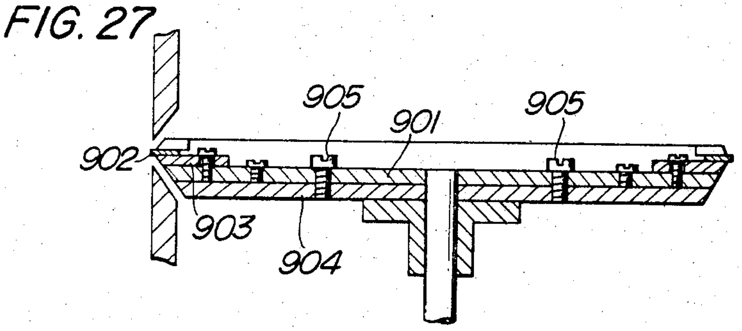
FIG. 27 is a sectional side view of still another embodiment of the rotary head device according to the present invention.

In FIG. 27, a magnetic transducer comprising the combination of a head tip 902 and a head mounting sub-base 903 is fixed by a fastening screw at each end of a head mounting base 901 of substantially rectangular shape, which is mounted on a rotary disc 904 by set screws 905. This structure comprises a stack of components, that is, the head mounting base 901 stacked on the rotary disc 904, the head mounting sub-bases 903 on the opposite ends of the head mounting base 901, and the head tip 902 on each head mounting sub-base 903. A drawback involved in this structure results from the fact that machining errors in the head mounting base 901 and the head mounting sub-bases 903 are accumulated to bring forth an error in the height required for each head tip 902. Therefore high accuracy has been demanded for the thickness of the head mounting base 901, the head mounting sub-bases 903, etc. and sufficiently close adjustment has been required during the assembling of these components.

Figure 28:
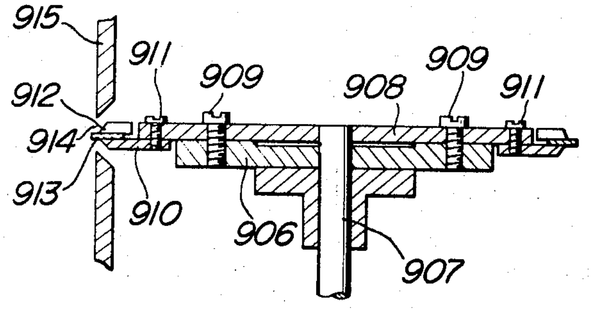
FIG. 28 is a sectional side view of an improvement of the device shown in FIG. 27.

A structure shown in FIG. 28 provides an improvement to eliminate the accumulated errors as described above and to obviate any increase in unnecessary works. In FIG. 28, a head mounting base 908 of substantially rectangular shape is fixed by set screws 909 to a rotary disc 906 securely mounted on a motor shaft 907. Head mounting sub-bases 910 are fixed by set screws 911 to those portions of the lower face of the head mounting base 908 which protrude beyond the end edges of the rotary disc 906, that is, on the same plane with the plane at which the head mounting base 908 contacts with the rotary disc 906. Head tips 913 of magnetic heads are mounted on the upper faces of the head mounting sub-bases 910, that is, on the same plane with the plane at which the head mounting base 908 contacts with the head mounting sub-bases 910. A slit 914 is provided at a portion of the outer peripheral face of a tape guide cylinder 915 so that the outer ends of the head tips 913 can protrude from this slit 914. According to this structure, the rotary disc 906 and the head mounting sub-bases 910 are fitted to the same finished surface of the head mounting base 908, and the head tips 913 are fitted to the same finished surfaces of the head mounting sub-bases 910. By virtue of the above manner of mounting, any difference in respective thicknesses of the head mounting base and the head mounting sub-bases does not exert any influence on the height of the head tips, and thus the head mounting base and the head mounting sub-bases may be finish machined at only one face, that is, the face to which the respective components are fixed. This structure is remarkably advantageous in that extremely high accuracy in the height of the head tips can be obtained without any accumulated errors and there is no need of close adjustment after assembling of the components. Better interchangeability of the head mounting base is an additional advantage.

Figure 29:
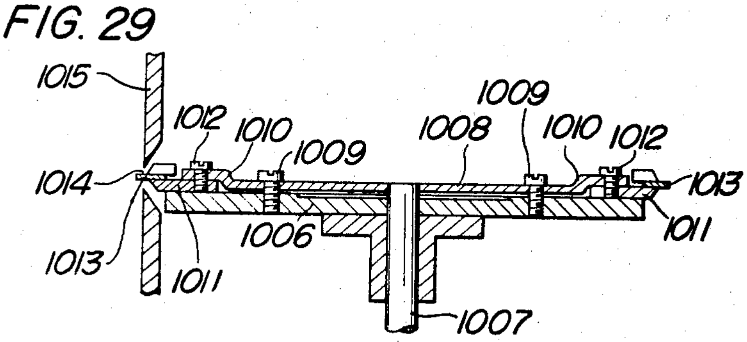
FIG. 29 is a sectional side view of another improvement of the device shown in FIG. 27.

A structure shown in FIG. 29 provides a further improvement in the structure of FIG. 27. In FIG. 29, a rotary disc 1006 is securely mounted on a motor shaft 1007 for unitary rotation therewith. A head mounting base 1008 of substantially rectangular shape is secured to the rotary disc 1006 by set screws 1009 and is suitably bent at opposite ends thereof as at 1010. A head mounting sub-base 1011 is fitted to the lower face of each bent end portion 1010 of the head mounting base 1008 by a set screw 1012. A head tip 1013 is mounted on the same plane with the plane at which each head mounting sub-base 1011 is fixed to the head mounting base 1008. In this structure it will be known that, when the head mounting base 1008 is mounted on the rotary disc 1006, the head mounting sub-bases 1011 are interposed therebetween with the other or lower faces of the head mounting sub-bases 1011 forced onto the finished face portions of the rotary disc 1006. A slit 1014 is provided at a portion of the outer peripheral face of a tape guide cylinder 1015 so that the outer ends of the head tips 1013 on the head mounting sub-bases 1011 can protrude from the slit 1014. According to this structure, the head mounting base 1008 is fixed to the rotary disc 1006 with the head mounting sub-bases 1011 fitted to the lower surface portions at the opposite ends thereof and brought into pressure contact with the upper finished surface portions of the rotary disc 1006. Therefore the height of the magnetic heads is solely determined by the action of forcing the head mounting sub-bases onto the finished surface portions of the rotary disc. This structure is especially advantageous in that assembling accuracy can extremely easily be obtained because the mounting height of the magnetic heads is not directly affected by the accumulation of errors unlike the prior structures and in that the accuracy in respect of head height is solely determined by the thickness of the head mounting sub-bases and is not affected by the accuracy of any other components because the head mounting sub-bases having the magnetic heads thereon are directly forced onto the finished surface portions of the rotary disc.

In the foregoing description, the basic concepts of the magnetic recording and reproducing apparatus of the present invention have been introduced. In the following description, a materialized embodiment of the rotary head device in the magnetic recording and reproducing apparatus in accordance with the present invention will be introduced in order that the contents of the present invention can be understood in more detail.

Figure 30:
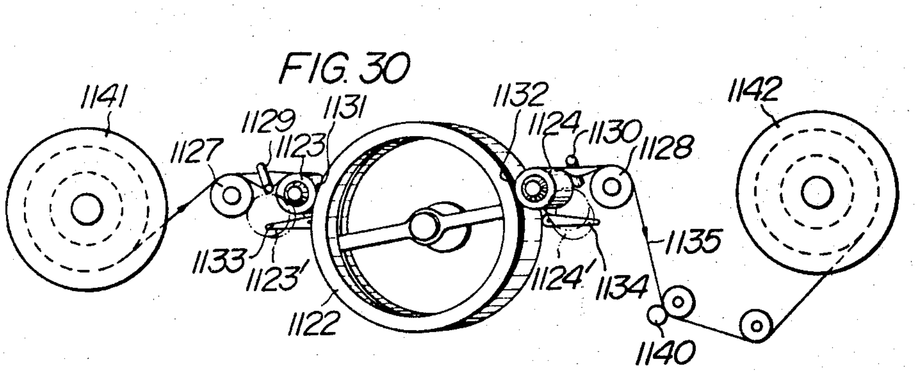
FIG. 30 is a top plan view showing an arrangement of the magnetic recording and reproducing apparatus having the rotary head device according to the present invention.
Figure 31:
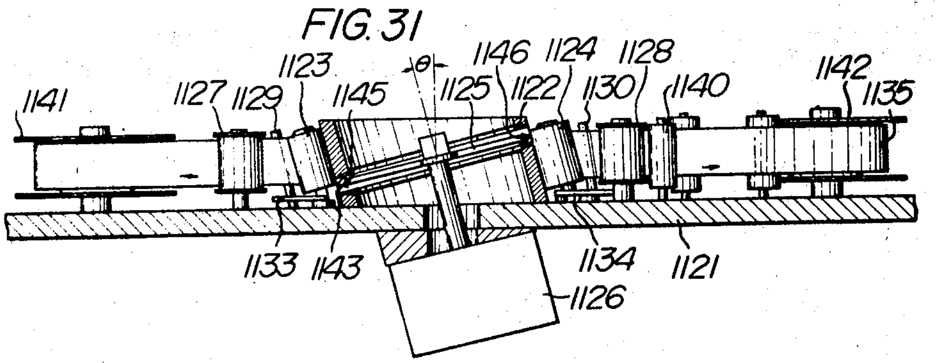
FIG. 31 is a fragmentarily sectional side view of the apparatus of FIG. 30.
Figure 32:
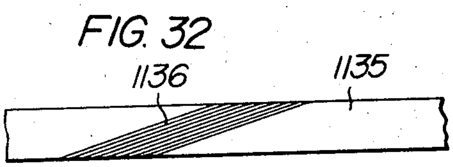
FIG. 32 is a plan view of part of a magnetic tape on which a plurality of tracks are shown as recorded by the apparatus of FIG. 30.

FIGS. 30 to 32 show an entire arrangement of a preferred form of the magnetic recording and reproducing apparatus of the present invention. At first, details of elements forming the rotary head device of the present invention will be described with reference to the drawings. The rotary head device includes an electric motor 1126 which is of four poles, hysteresis synchronous type and rotates at a rate of 1,800 r.p.m. when supplied with commercial A.C. input at 60 cycles per second and 117 volts. The shaft of this motor 1126 makes an angle $\theta$ of about 5°11′ with respect to a line perpendicular to a base plate 1121, and carries thereon a rotary disc having a diameter of about 200 mm. A head mounting base 1125 of substantially rectangular shape having a width of 30 mm., a thickness of 5 mm. and a length of 210 mm. is fixed on this rotary disc and has two head mounting sub-bases 1145 and 1146 mounted on opposite ends thereof. Head tips having a thickness of 0.4 mm. are fixed on the upper faces of the head mounting sub-bases 1145 and 1146 in a manner that the outer ends thereof are spaced a distance of 220 mm. The outer ends of the head tips are rotated at a rate of 20 meters per second by being driven by the motor 1126 through the rotary disc and the head mounting base 1125. A magnetic tape 1135 shown herein is the one commonly called video tape which is 1 inch wide and 37.5 $\mu$m. thick. The tape 1135 travels at a rate of 15 inches per second by being driven by a capstan drive 1140. As a result, linearly recorded tracks 1136 are formed on the magnetic tape 1135 at an angle with respect to the longitudinal center line of the tape. A slit 1143 of a width of the order of 1 mm. is provided on the peripheral side face of a cylindrical tape guide member 1122 in a manner to cover an arc of about 100° which is slightly longer than the semi-circumference at which the magnetic tape 1135 makes moving contact with the tape guide member 1122. The tips of the magnetic heads rotate along the longitudinal center line of the slit 1143 while protruding from the slit 1143 and making contact with the moving tape 1135. It is therefore necessary to mount in the cylindrical tape guide member 1122 the head mounting base 1125 carrying thereon the head tips in a manner that the head tips can suitably protrude from the slit 1143.

This problem will be discussed in more detail with regard to the structure as shown in FIG. 16. In FIG. 16, the rotary disc 603 securely mounted on the motor shaft 607 is disposed in the tape guide cylinder 605. In this structure, the head mounting base 601 carrying thereon the head tips can not conveniently be mounted on the rotary disc 603 because the guide face of the tape guide cylinder 605 has a substantial thickness, the distance between the head tips is longer than the outer peripheral diameter of the tape guide cylinder 605, and the head tip 0.4 mm. thick must be inserted in the slit 606 of a width of 1 mm. To deal with this difficulty, a method must be employed according to which the tape guide cylinder 605 is split into upper and lower halves at the slit 606 so that the upper half is removed to permit the insertion of the head mounting base 601 and after insertion this upper half of the tape guide cylinder 605 is fixed in place. Moreover, the head mounting base 601 and the rotary disc 603 must have interfitting portions in order that the mounting base 601 can be mounted on the rotary disc 603 with the center of the former correctly registered with respect to the center of the latter. Further, splitting of the tape guide cylinder 605 into upper and lower halves provides a problem in respect of machining, accuracy and strength. Thus there has arisen a necessity for a convenient method of mounting the head mounting base in a tape guide cylinder of one-piece structure. This improved method is as shown in FIG. 16 in which interfitting portions are provided on both of the rotary disc 603 and the head mounting base 601. In this case, the head mounting base 601 can not be disengaged from the rotary disc 603 unless the head mounting base 601 is pulled upwardly. Since however the slit 606 of the tape guide cylinder 605 has a width of 1 mm. and the head tips have a thickness of 0.4 mm., the depth of interfit available is only 0.3 mm. at maximum. Repeated mounting and dismounting on this 0.3 mm. interfitting dimension will result in a loose fit between the rotary disc and the head mounting base and in the out of registration of their centers of rotation. A method has also been proposed in which no interfitting portions are provided and the head mounting base 601 is slid rightwards until the head tip is moved away from the slit of the tape guide cylinder 605, then the head mounting base 601 is lifted upwardly. In this case however, a lot of time has generally been wasted before the center of rotation of the head mounting base can properly be established.

A first method to solve the above problems will be described with reference to FIGS. 11 and 12. The motor shaft 401 rotating at 1,800 r.p.m. has a diameter of 8 mm.+0.008 mm., −0.00 mm. and is securely fixed in the axial bore provided at the center of rotation of the flange 402 having a height of 28 mm., this flange 402 having a discoidal upper face of 85 mm. in diameter. The head mounting base 403 is sized to have a length of 126.8 mm.±0.05 mm., a width of 15 mm. and a thickness of 6.5 mm. and the perforation 405 provided at the center of rotation thereof has a diameter of 8 mm.+0.008 mm., −0.00 mm. The joining shaft 407 of the joining member 412 has a diameter of 8 mm.+0.00 mm., −0.005 mm. and a length of 11 mm. while the shaft 406 with slip rings thereon has a diameter of 5.5 mm. and a length of 24.5 mm. These shafts extend coaxially in opposite directions by being connected by a central web. The web has a depending leg in the form of hollow semicylinder having a diameter of 44 mm. and a height of 8.5 mm., and two cut-outs are provided in its side wall to allow for passage of the head mounting base 403 therethrough. When the center of rotation of the head mounting base 403 is coaxially connected by the joining shaft 407 with the center of rotation of the motor shaft 401 as described above, the joining shaft 407 extends through the central perforation 405 of the head mounting base 403 into the central axial bore of the flange 402 by a depth of 2.5 mm. Then, the depending leg of the web of the joining member 412 is pressed on the discoidal upper face of the flange 402 by four set screws 408 and the head mounting base 403 is fixed on discoidal face of the flange 402 by two set screws 409. This arrangement eliminates various problems as described above and required high accuracy is still maintained even when the head mounting base 403 is replaced in position after dismounting since dismounting of the head mounting base 403 can easily be effected by merely disengaging the joining shaft 407 from the bore of the flange 402 and sliding the head mounting base 403 on the discoidal face of the flange 402 to be taken out of the access opening of the tape guide cylinder.

A second method to solve the above-described problems will next be described with reference to FIG. 17. In the structure shown in FIG. 17, the top end 617 of the motor shaft 615 is cut out at parallel two faces as described previously and the elongated perforation 618 is provided on the head mounting base 612 to receive therein the cut-out end 617 of the motor shaft 615. The head mounting base 612 is fitted on this cut-out end 617 at that portion of the perforation 618 at which the head tip 622 may not abut the tape guide cylinder 623 and is then slid on the rotary disc 614 until the outer end of the head tip 622 suitably protrudes from the tape guide cylinder 623. By rotating the rotary disc 614 through an angle of about 90° at this position of the head mounting base 612 and fixing it in position, the center of the head mounting base 612 can be brought into registry with respect to the center of the motor shaft 615. At this registered position, the head mounting base 612 is secured to the rotary disc 614 by set screws 613.

Detailed description will further be given with reference to FIGS. 27 to 29. In the structure of FIG. 27, the upper face of the rotary disc 904, that is, the face on which the head mounting base 901 is securely fixed is machined to smooth finish and the rotary disc 904 is fixed to the motor shaft so that the upper face of the rotary disc 904 lies in the predetermined plane of rotation. Therefore, the required mounting dimension of the head tips 902 depends on the dimensional accuracy thereof above the upper face of the rotary disc 904, this upper face being the base plane. In this structure, the head mounting base 901 of substantially rectangular shape has a width of 30 mm., a length of 210 mm. and a thickness of 5 mm.±0.005 mm., and the head mounting sub-bases 903 mounted on this upper face have a thickness of 3 mm.±0.005 mm., with the result that the distance between the upper face of the rotary disc 904 and the lower face of each head tip 902 gives a dimension of 8 mm.±0.01 mm. Thus the errors are accumulated to give an actual dimension of from 7.99 mm. to 8.01 mm. although these elements are fabricated to high accuracy. This tiered structure requires machining on both faces of the elements and also demands high accuracy in their thickness.

The structure shown in FIG. 28 provides a first method of minimizing the unnecessarily increasing mechanical works and accumulated errors as described above. In the structure of FIG. 28, the rotary disc 906 is likewise fixedly mounted on the motor shaft 907 with its upper face positioned to lie in the predetermined plane of rotation, and the head mounting base 908 is fixed on the rotary disc 906. According to this structure, that face only of the head mounting base 908 at which it is fixed on the rotary disc 906 is machined to flat finish while no machining is required for the other face and any finish of high accuracy in its thickness is unnecessary unlike prior structures. Also according to this structure, that face of each head mounting sub-base 910 on which the head tip 913 is fixed is secured to that face of the head mounting base 908 to which the rotary disc 906 is secured. This structure is advantageous in that any accuracy in the thickness of the head mounting sub-bases 910 is also unnecessary and each sub-base 910 may merely be machined to flat finish at that face only on which the head tip 913 is fixed. As described above, the head mounting base 908 and the head mounting sub-bases 910 may merely be flat finished at their single face and their dimensional accuracy in respect of thickness is quite independent of the height of the head tips 913. Therefore such high accuracy of ±0.001 mm. as is the case with the structure of FIG. 27 is entirely unnecessary.

In a second method of improvement shown in FIG. 29, the rotary disc 1006 is likewise securely mounted on the motor shaft 1007 with its upper face positioned in the predetermined plane of rotation as described previously and the head mounting base 1008 is fixed on the rotary disc 1006. The head mounting base 1008 is provided at opposite ends thereof with the bent portions 1010 for carrying thereon the head mounting sub-bases 1011. As in the case of the structure of FIG. 27, the head mounting sub-bases 1011 have both faces finished flat to a thickness of 3 mm.±0.005 mm. Because of this manner of mounting, the finished dimension between the upper face of the rotary disc 1006 and the lower face of each head tip 1013 gives an accuracy of 3 mm.±0.005 mm., which accuracy is high compared with 8 mm.±0.01 mm. in the case of FIG. 27. In FIG. 29, the rotary disc 1006 may simply be mounted on the motor shaft 1007 at a position 5 mm. above the previous position. This structure is advantageous in that flat finish of an especially high grade need not be applied to both faces of the head mounting base 1008 and those face portions of the rotary disc 1006 at which it contacts the head mounting sub-bases 1011 may merely be finished flat since the rotary disc 1006 serving as a pressing means to securely press the head mounting sub-bases 1011 onto the head mounting base 1008 does not bodily contact the head mounting base 1008 and is bodily contacted by the head mounting sub-bases 1011.

While certain selective embodiments of the invention have been described in the foregoing, it will be understood that the invention is in no way limited to such specific embodiments and various changes and modifications may be made without departing from the spirit and scope of the invention.

What we claim is:

1. An apparatus for the magnetic recording and reproduction of wide-band signals comprising a magnetic tape, a tape guide member, rotary heads including magnetic transducers, said magnetic transducers being adapted to successively sweep across said magnetic tape in slanted relation with respect thereto, said tape guide member forming a partial cylindrical face having a central axis, a rotary head mounting base of substantially rectangular shape disposed in said tape guide member to extend to the periphery of said cylindrical face and having said rotary heads mounted on opposite ends thereof, a motor shaft for causing rotation of said head mounting base in a plane at a predetermined angle with respect to said central axis, a flange means disposed at the central portion of said head mounting base and securely fixed centrally thereof to said motor shaft in order to transmit the drive power from said motor shaft to said head mounting base, a central perforation provided at the center of rotation of said head mounting base, means for securing said head mounting base to said flange means with said central perforation of said head mounting base coaxially engaged with said motor shaft, and an access opening provided on that side of said tape guide member at which said magnetic tape does not make moving contact with said tape guide member so as to permit insertion and withdrawal of said head mounting base therethrough.

2. An apparatus for the magnetic recording and reproduction of wide-band signals comprising a magnetic tape, a tape guide member, rotary heads including magnetic transducers, said magnetic transducers being adapted to successively sweep across said magnetic tape in slanted relation with respect thereto, said tape guide member forming a partial cylindrical face having a central axis, a rotary head mounting base of substantially rectangular shape disposed in said tape guide member to extend to the periphery of said cylindrical face and having said rotary heads mounted on opposite ends thereof, a motor shaft for causing rototion of said head mounting base in a plane at a predetermined angle with respect to said central axis, a flange means disposed coaxially with the center of rotation of said head mounting base in order to transmit the drive power from said motor shaft to said head mounting base, said flange means being provided centrally thereof with an axial bore extending therethrough, means for securely fixing one end of said axial bore of said flange means to said motor shaft, a pin movably received in the other end of said axial bore of said flange means, a spring means interposed between the bottom of said pin and the end of said motor shaft so as to normally urge said pin towards said head mounting base, a central perforation provided at the center of rotation of said head mounting base so as to receive therein the head of said pin, and means for securely fixing said head mounting base to said flange means so that after said head mounting base is slid on the surface of said flange means while forcing downwardly the head of said pin with its bottom face until the head of said pin fits in said central perforation of said head mounting base, said head mounting base can be secured to said flange means.

3. An apparatus for the magnetic recording and reproduction of wide-band signals comprising a magnetic tape, a tape guide member, rotary heads including magnetic transducers, said magnetic transducers being adapted to successively sweep across said magnetic tape in slanted relation with respect thereto, said tape guide member forming a partial cylindrical face having a central axis, a rotary head mounting base of substantially rectangular shape disposed in said tape guide member to extend to the periphery of said cylindrical face and having said rotary heads mounted on opposite ends thereof, a motor shaft for causing rotation of said head mounting base in a plane at a predetermined angle with respect to said central axis, a flange means disposed coaxially with the center of rotation of said head mounting base in order to transmit the drive power from said motor shaft to said head mounting base, said flange means being provided centrally thereof with an axial bore extending therethrough, means for securely fixing one end of said axial bore of said flange means to said motor shaft, a central perforation provided at the center of the rotation of said head mounting base, and a joining member for joining said head mounting base to said flange means, said joining member being provided at one end thereof with a shaft having slip rings thereon and at the other end thereof with a shaft adapted to fit in said central perforation of said head mounting base and in the other end of said axial bore of said flange means.

4. An apparatus for the magnetic recording and reproduction of wide-band signals comprising a magnetic tape, a tape guide member, rotary heads including magnetic transducers, said magnetic transducers being adapted to successively sweep across said magnetic tape in slanted relation with respect thereto, said tape guide member forming a partial cylindrical face having a central axis, a rotary head mounting base of substantially rectangular shape disposed in said tape guide member to extend to the periphery of said cylindrical face and having said rotary heads mounted on opposite ends thereof, a motor shaft for causing rotation of said head mounting base in a plane at a predetermined angle with respect to said central axis, a flange means disposed coaxially with the center of rotation of said head mounting base in order to transmit the drive power from said motor shaft to said head mounting base, said flange means being provided centrally thereof with an axial bore extending therethrough, means for securely fixing one end of said axial bore of said flange means to said motor shaft, a central perforation provided at the center of rotation of said head mounting base, a joining member for joining said head mounting base to said flange means, said joining member being provided at one end thereof with a shaft having slip rings thereon and at the other end thereof with a shaft adapted to fit in said central perforation of said head mounting base and in the other end of said axial bore of said flange means, and spring means for resiliently mounting said joining member on said flange means in order that said joining shaft of said joining member can be disengaged from said central perforation and said axial bore during mounting and dismounting of said head mounting base.

5. An apparatus for the magnetic recording and reproduction of wide-band signals comprising a magnetic tape, a tape guide member, rotary heads including magnetic transducers, said magnetic transducers being adapted to successively sweep across said magnetic tape in slanted relation with respect thereto, said tape guide member forming a partial cylindrical face having a central axis, a rotary head mounting base of substantially rectangular shape disposed in said tape guide member to extend to the periphery of said cylindrical face and having said rotary heads mounted on opposite ends thereof, a motor shaft for causing rotation of said head mounting base in a plane at a predetermined angle with respect to said central axis, a flange means disposed at the central portion of said head mounting base and securely fixed centrally thereof to said motor shaft in order to transmit the drive power from said motor shaft to said head mounting base, said motor shaft having one end thereof protruded above the surface of said flange means, a cut-out provided at said end of said motor shaft, and a central perforation provided at the center of rotation of said head mounting base, said central perforation being formed of a large diameter portion capable of receiving therein said motor shaft and small diameter portions on opposite sides of said large diameter portion capable of receiving therein said cut-out end of said motor shaft, whereby the angular relation between said motor shaft and said central perforation can be utilized to attain engagement and disengagement therebetween by turning and sliding movement of said head mounting base in its plane.

6. An apparatus for the magnetic recording and reproduction of wide-band signals comprising a magnetic tape, a tape guide member, rotary heads including magnetic transducers, said magnetic transducers being adapted to successively sweep across said magnetic tape in slanted relation with respect thereto, said tape guide member forming a partial cylindrical face having a central axis, a rotary head mounting base of substantially rectangular shape disposed in said tape guide member to extend to the periphery of said cylindrical face and having said rotary heads mounted on opposite ends thereof, a motor shaft for causing rotation of said head mounting base in a plane at a predetermined angle with respect to said central axis, a flange means disposed at the central portion of said head mounting base and securely fixed centrally thereof to said motor shaft in order to transmit the drive power from said motor shaft to said head mounting base, rotary head disc sectors of substantially semicircular shape of flexible material disposed on opposite sides of said head mounting base in a manner to hold said head mounting base therebetween, and an access opening provided on that side of said tape guide member at which said magnetic tape does not make moving contact with said tape guide member so as to permit insertion and withdrawal of said head mounting base therethrough.

7. An apparatus for the magnetic recording and reproduction of wide-band signals comprising a magnetic tape, a tape guide member, rotary heads including magnetic transducers, said magnetic transducers being adapted to successively sweep across said magnetic tape in slanted relation with respect thereto, said tape guide member forming a partial cylindrical face having a central axis, a rotary disc having thereon a head mounting base of substantially rectangular shape, said head mounting base being disposed in said tape guide member to extend to the periphery of said cylindrical face and having said rotary heads mounted on opposite ends thereof, a motor shaft for driving said rotary disc in a plane at a predetermined angle with respect to said central axis, a flange means disposed coaxially with the center of said rotary disc and securely fixed centrally thereof to said motor shaft in order to transmit the drive power from said motor shaft to said rotary disc, said head mounting base being disposed to lie on a diametral line of said rotary disc, a first central perforation provided at the center of rotation of said head mounting base in coaxial relation with the center of said rotary disc, a second central perforation provided at the center of said rotary disc and having an inside diameter greater than that of said first central perforation, a first annular projection of small diameter and a second annular projection of large diameter provided in concentrically stepped relation on the central surface of said flange means, and means for securely fixing said head mounting base and said flange means to said rotary disc after said first and second annular projections are fitted in said first and second perforations, respectively.

8. An apparatus for the magnetic recording and reproduction of wide-band signals comprising a magnetic tape, a tape guide member, rotary heads including magnetic transducers, said magnetic transducers being adapted to successively sweep across said magnetic tape in slanted relation with respect thereto, said tape guide member forming a partial cylindrical face having a central axis, a rotary disc having thereon a head mounting base of substantially rectangular shape, said head mounting base supporting thereon said rotary heads disposed on the periphery of said cylindrical face, a motor shaft for driving said rotary disc in a plane at a predetermined angle with respect to said central axis, a flange means disposed coaxially with said rotary disc and securely fixed centrally thereof to said motor shaft in order to transmit the drive power from said motor shaft to said rotary disc, head mounting sub-bases each having one of said rotary magnetic heads mounted thereon, means for securely fixing said head mounting sub-bases on opposite ends of said head mounting base in a manner that the upper faces of said head mounting sub-bases lie in the same plane with the mounting plane between said head mounting base and said rotary disc, and means for securely fixing head tips of said rotary magnetic heads on said head mounting sub-bases in a manner that the lower faces of said head tips lie in the same plane with the mounting plane between said head mounting sub-bases and said head mounting base.

9. An apparatus for the magnetic recording and reproduction of wide-band signals comprising a magnetic tape, a tape guide member, rotary heads including magnetic transducers, said magnetic transducers being adapted to successively sweep across said magnetic tape in slanted relation with respect thereto, said tape guide member forming a partial cylindrical face having a central axis, a rotary disc having thereon a head mounting base of substantially rectangular shape, said head mounting base supporting at opposite ends thereof said rotary heads disposed on the periphery of said cylindrical face, said opposite ends of said head mounting base being suitably bent to leave a space between them and said rotary disc, a motor shaft for driving said rotary disc in a plane at a predetermined angle with respect to said central axis, a flange means disposed coaxially with the center of said rotary disc and securely fixed centrally thereof to said motor shaft in order to transmit the drive power from said motor shaft to said rotary disc, head mounting sub-bases each having one of said rotary magnetic heads mounted thereon, means for securely fixing said head mounting sub-bases in said respective spaces between said rotary disc and said bent end portions of said head mounting base, and means for securely fixing said head mounting base on the surface of said rotary disc and at the same time pressing said head mounting sub-bases onto the finished peripheral surface portions of said rotary disc.

References Cited

UNITED STATES PATENTS

| | | | |
|---|---|---|---|
| 3,202,771 | 8/1965 | Wada ------------ | 179—100.2 |
| 3,235,670 | 2/1966 | Kihara ----------- | 179—100.2 |
| 3,286,041 | 11/1966 | Nishiwaki -------- | 179—100.2 |
| 3,319,015 | 5/1967 | Eccarius et al. ----- | 179—100.2 |

STANLEY M. URYNOWICZ, Jr., *Primary Examiner.*

J. R. GOUDEAU, *Assistant Examiner.*

U.S Cl.. X.R.

178—6.6; 274—4